United States Patent [19]

Bojarska-Dahlig et al.

[11] 3,925,352
[45] Dec. 9, 1975

[54] L-ASPARTATE OF CYCLIC ERYTHROMYCIN A CARBONATE AND PROCESS OF PREPARING THE SAME

[75] Inventors: Halina Bojarska-Dahlig; Zdzislaw Szypka, both of Warsaw, Poland

[73] Assignee: Instytut Przemysku Farmaceutycznego, Warsaw, Poland

[22] Filed: July 29, 1974

[21] Appl. No.: 492,916

[30] Foreign Application Priority Data
July 28, 1973 Poland .............................. 164368

[52] U.S. Cl. ............................ 260/210 E; 424/182
[51] Int. Cl.² .......................................... C07G 3/00
[58] Field of Search ............................... 260/210 E

[56] References Cited
UNITED STATES PATENTS 3,417,077   12/1968   Murphy et al. ................. 260/210 E
3,764,595   10/1973   Fabrizo et al. ................. 260/210 E

*Primary Examiner*—Johnnie R. Brown
*Assistant Examiner*—Cary Owens
*Attorney, Agent, or Firm*—Haseltine, Lake & Waters

[57] ABSTRACT

A novel compound, the L-aspartate of cyclic erythromycin A carbonate, is described herein. This compound possesses an unusually valuable combination of pharmocological properties, including a high level of biological activity, excellent absorption, and low toxicity. The product is prepared by reacting cyclic erythromycin A carbonate with L-aspartic acid in an aqueous medium or in a mixture of water and an organic solvent.

1 Claim, No Drawings

L-ASPARTATE OF CYCLIC ERYTHROMYCIN A CARBONATE AND PROCESS OF PREPARING THE SAME

This invention relates to the L-aspartate of cyclic erythromycin A carbonate, a new compound belonging to the group of erythromycin antibiotics, which is characterized by high antimicrobial activity, low toxicity, and high absorption.

One of the known antibiotics of the erythromycin group is the cyclic erythromycin A carbonate derivative, most probably the 9,11-carbonate, which is produced by chemical modification of erythromycin A aglucone during reaction of the parent antibiotic with ethylene carbonate. This compound is one of the few derivatives of erythromycin which show antibiotic activity more favorable than the parent erythromycin itself.

This cyclic erythromycin A carbonate is a basic compound with an ionization constant, $pK_a$ of 8.59. The presence of an N,N-dimethylamine group in the desosaminyl moiety of the molecule enables the preparation of various salt derivatives by reaction with acids. Many such salts have been described in the literature previously. These salts have been formed by reaction with mineral acids, as for example, with hydrochloric or hydroiodic acids; with aliphatic acids containing various additional functional groups, as e.g., lactates, L-glutaminates, and lauryl sulfates, described by Bojarska-Dahlig and W. Slawinski in Roczniki Chem., 46, 2211, (1972), and with aromatic acids, e.g., cinnamates and hydrocinnamates.

These salts possess the same high antimicrobial activity as that of the parent antibiotic; unfortunately however, they also exhibit acute toxicity (values $LD_{50}$) and poor absorption and apparent partition coefficient characteristics, (the partition coefficient being defined as the ratio of the concentration in n-octanol and in water in the equilibrium state).

In accordance with the present invention, a new salt of cyclic erythromycin A carbonate is provided which has been found unexpectedly to possess very valuable and advantageous pharmacokinetic and antimicrobial properties. This novel salt is the L-aspartate of cyclic erythromycin A carbonate. The novel compound of this invention is formed by reaction of cyclic erythromycin A carbonate with L-aspartic acid, an acidic amino acid. The unusual biological activity of the novel L-aspartate of cyclic erythromycin A carbonate of the invention was determined by the plate-cylinder method using as test strain Bacillus pumilus 8241, was 1985 units/mg. This activity compares very favorably with the specifications of the British Pharmacopoeia of 1968 which requires a biological activity for erythromycin not less than 920 units mg in comparison with a standard of 950 units. The minimum inhibiting concentrations (MIC) for such strains as Staphylococcus aureus 209 P, Salmonella typhi 4, Proteus vulgaris 355, Escherichia coli 308, Escherichia coli 10536, Bacillus subtilis 6633, Bacillus subtilis 9524, Diplococcus pneumoniae, Enterococcus, are of the same order as for cyclic erythromycin A carbonate.

In addition to its more favorable biological activity, L-aspartate of cyclic erythromycin A carbonate exhibits lower toxicity and has better absorption characteristics then cyclic erythromycin A carbonate or erythromycin. The data given immediately below, for example, illustrates the absorption characteristics of this compound in comparison with the prior art materials.

Equal amounts by weight of both the L-aspartate of cyclic erythromycin A carbonate and cyclic erythromycin A carbonate were administered orally to rats. Taking the levels of the cyclic erythromycin A carbonates in blood serum as 100 %, the L-aspartate of cyclic erythromycin A carbonate shows, after 15 minutes, 186 %, after 30 minutes, 226 %, after 1 hour 172 % after 2 hours, 132 %, after 3 hours, 100 %, after 5 hours, 103 %, and after 7 hours, 130 % respectively.

Similarly, with respect to absorption in pulmonary tissue, assuming the level of cyclic carbonate upon oral administration as 100 %, the absorption characteristics of L-aspartate of cyclic erythromycin A carbonate are the following: after 1 hour, 188 %, after 2 hours, 242 %, after 3 hours, 322 %, after 5 hours, 250 %, and after 7 hours, 446 %, respectively.

On oral administration to rats of the same amounts by weight of the L-aspartate of cyclic erythromycin A carbonate and erythromycin, assuming the levels of erythromycin in blood serum as 100 %, for the L-aspartate of cyclic erythromycin A carbonate there is obtained: after 15 minutes, 156 %, after 30 minutes, 430 %, after 1 hour, 477 %, after 2 hours, 212 %, after 3 hours, 170 %, and after 5 hours, 103 %, respectively; and under analogic assumption for the pulmonary tissue: after 1 hour, 1010 %, after 2 hours, 973 %, after 3 hours, 1590 %, after 5 hours, 1300 %, and after 7 hours, 514 %.

With respect to toxicity level, the acute toxicity, $LD_{50}$, of cyclic erythromycin A carbonate in white mice is 4.05 g/kg, and erythromycin is 2.58 g/kg, whereas the L-aspartate of cyclic erythromycin A carbonate did not show any toxic activity in doses of from 2.5 g/kg to 5 g/kg.

The apparent partition coefficient of L-aspartate of cyclic erythromycin A carbonate in n-octanol/water system which is calculated as the ratio of the respective concentrations in each solvent at equilibrium, is 109.

The L-aspartate of cyclic erythromycin A carbonate of the invention is made by reacting cyclic erythromycin A carbonate with a stoichiometric quantity of L-aspartic acid in an aqueous medium, or in a mixture of water with an organic solvent, at a temperature within a range from room temperature to the boiling point of the reaction mixture, and for a time necessary for obtaining a dissolution of the reactants. The solution of the reactants then is lyophilized, or the organic solvent and water is evaporated therefrom. Thereafter, if desired, water is removed in form of an azeotrophic binary or ternary mixture by adding a solvent to form an azeotrope.

The L-aspartate of cyclic erythromycin A carbonate compound forms a monohydrate having the empirical formula $C_{42}H_{72}N_2O_{18} \cdot H_2O$, a colorless substance which is soluble in water. The IR-spectrum in KBr within the range 1100 – 1900 $cm^{-1}$ shows characteristic peaks at the following wave lengths: 1180, 1250, 1395, 1475, 1630, 1750, and 1820 $cm^{-1}$. The NMR-spectrum in diluted deuterium methanol shows distinct signals within the range $1\delta - 3\delta$ at $\delta = 2.86/s$, $6H - N/CH_3/_2/$, $\delta = 1.61$, $\delta = 1.25$.

Hereinbelow are specific Examples illustrating the method of production of the compound according to the invention:

EXAMPLE I

To 3.8 g of cyclic erythromycin A carbonate dissolved in 10 ml. of boiling acetone was added a solution of 0.665 g of L-aspartatic acid in 50 ml. of water. The reactants were heated to dissolution. The acetone then was removed under reduced pressure, and the residue was lyophilized. The product is the monohydrate of L-aspartate of cyclic erythromycin A carbonate, melting point 131° – 142°C, in accordance with the theoretical yield.

The elemental analysis for the formula $C_{42}H_{72}N_2O_{18}\cdot H_2O$: calculated: C 55.38 % H 8.19 % N 3.07 % O 33.38 % obtained: C 55.57 % H 8.24 % N 2.62 % O 33.40 %.

EXAMPLE II

To 3.8 g of cyclic erythromycin A carbonate dissolved in 40 ml. of 96 % ethanol was added a solution of 0.665 g of L-aspartic acid in 40 ml. of water and mixed to dissolution. Most of the solvents were evaporated under reduced pressure, absolute ethanol was added, and the remaining water was distilled off. A product was obtained which was identical to the compound described in Example I. Further drying under reduced pressure gave an anhydrous product.

EXAMPLE III

To 3.8 g of cyclic erythromycin A carbonate dissolved in 10 ml. of boiling acetone was added a solution of 0.665 g of L-aspartic acid in 20 ml. of hot water and the mixture was heated to obtain a clear solution. The solvents were removed under reduced pressure, benzene was added, and the remaining water was distilled off together with the benzene to provide the desired product.

EXAMPLE IV

To 3.8 g of cyclic erythromycin A carbonate dissolved in 10 ml. of 96 % ethanol, 0.665 g of L-aspartic acid was poured in, and while heating the mixture at its boiling temperature, water was added gradually to obtain dissolution. Then benzene was added to the reaction mixture and the solvents were evaporated under reduced pressure to provide the desired product.

EXAMPLE V

To a suspension of 3.8 g of cyclic erythromycin A carbonate in 50 ml. of water a solution of 0.665 g of L-aspartic acid in 25 ml. of boiling water was added. The mixture was heated to produce a clear solution which was cooled and then lyophilized to provide the desired product.

What is claimed is:
1. L-aspartate of cyclic erythromycin A carbonate.

* * * * *